United States Patent [19]

Maeda et al.

[11] Patent Number: 4,904,567

[45] Date of Patent: * Feb. 27, 1990

[54] OPTICAL RECORDING MEMBER

[75] Inventors: Shuichi Maeda, Hidaka; Yutaka Kurose, Kawasaki; Junko Wada, Sagamihara, all of Japan

[73] Assignee: Mitsubishi Kasei Corporation, Tokyo, Japan

[*] Notice: The portion of the term of this patent subsequent to Sep. 6, 2005 has been disclaimed.

[21] Appl. No.: 157,229

[22] Filed: Feb. 18, 1988

Related U.S. Application Data

[63] Continuation-in-part of Ser. No. 30,868, Feb. 25, 1987, Pat. No. 4,769,307.

[30] Foreign Application Priority Data

Feb. 19, 1987 [JP] Japan ................... 62-34448

[51] Int. Cl.$^4$ ............... G11B 7/24; G01D 9/00; G03C 5/16; B41M 5/26
[52] U.S. Cl. ................... 430/270; 430/495; 430/945; 346/135.1; 540/140
[58] Field of Search .............. 430/270, 495, 945; 346/135.1; 540/139, 140

[56] References Cited

U.S. PATENT DOCUMENTS

| | | | |
|---|---|---|---|
| 4,492,750 | 1/1985 | Law et al. | 430/270 |
| 4,648,992 | 3/1987 | Graf et al. | 540/140 |
| 4,725,525 | 2/1988 | Kenney et al. | 430/270 |
| 4,769,307 | 9/1988 | Ozawa et al. | 430/270 |

FOREIGN PATENT DOCUMENTS

| | | |
|---|---|---|
| 3622590 | 3/1971 | Fed. Rep. of Germany |
| 1489394 | 10/1977 | United Kingdom |

Primary Examiner—Paul R. Michl
Assistant Examiner—Mark R. Buscher
Attorney, Agent, or Firm—Oblon, Spivak, McClelland, Maier & Neustadt

[57] ABSTRACT

An optical recording member comprising a recording layer containing a light abosrbing substance supported on a substrate in which recording is made by the thermal deformation of the recording layer owing to laser beams and reproduction is made by the reading the difference of the reflection between the non-deformation portion and the deformation portion, said light absorbing substance being represented by the following formula:

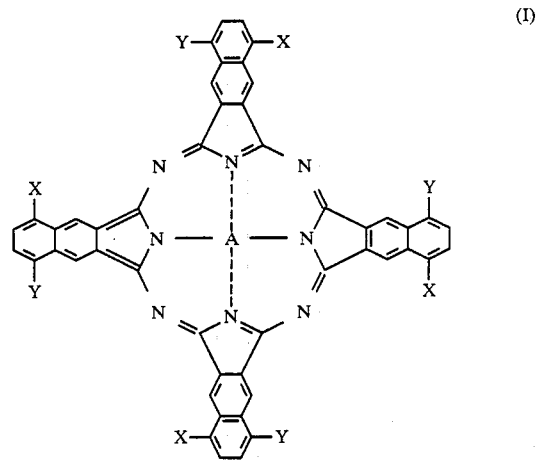

(I)

wherein one of X and Y is $-O(C_2H_4O)_nR$ wherein R is an alkyl group which may be branched and n is a number of from 1 to 6, and the other is a hydrogen atom, and A is VO, Cu, Ni, or Co.

8 Claims, No Drawings

OPTICAL RECORDING MEMBER

CROSS REFERENCE TO RELATED APPLICATIONS

This application is a continuation-in-part of application Serial Number 07/030,868 filed Feb. 25, 1987, now U.S. Pat. No. 4,769,307.

This invention relates to an optical recording member containing naphthoporphyradine type coloring matter in its information recording layer.

More specifically, the invention is concerned with such optical recording member that performs recording of information utilizing changes in the state of substance due to light energy having an oscillating wavelength of a semiconductor laser.

Development in the optical recording which utilizes the laser technology has been desired particularly in recent years owing to its capability of preservation and reproduction of information recorded in high density.

As one example of such optical recording, there may be mentioned an optical disc.

In general, the optical disc carries out high density recording of information by irradiation of laser beam which has been collimated to a beam diameter of 1 $\mu$m or so onto a thin recording layer provided on a circular base member.

The information recording is effected by thermal deformation of the recording layer such as its decomposition, evaporation, dissolution, and others which take place at particular portions of the recording layer owing to its absorption of the laser energy as irradiated onto it. On the other hand, the reproduction of the recorded information is done by reading of a difference in the reflection factor between the portion where the deformation has taken place by the laser beam and the portion where no deformation has occurred.

For the recording member, therefore, it is necessary to have high absorptivity to the laser beam of a particular wavelength to be used for the recording, because the recording member is required to absorb energy of the laser beam with good efficiency, and also to have high reflection factor to the laser beam of a particular wavelength for use in the reproduction so as to carry out the accurate reproduction of the recorded information.

For such optical recording member, there have so far been proposed various inorganic compounds such as metals, metal compounds, chalcogenides, and so on. However, the thin films made of these inorganic compounds have various disadvantages such that they are susceptible to oxidation in the air, difficult to preserve over a long period of time, sensitive to the ultraviolet part or the visible part of the light rays, not durable against the sun light and other lights, and so forth.

As the organic compounds to be used for the recording member, there have so far been proposed cyanine type coloring matter, squalerium type coloring matter, naphthoquinone type coloring matter, phthalocyanine type coloring matter, and so on.

Among these coloring matters, some of phthalocyanine type coloring matter exhibit absorptivity at the semiconductor laser wavelength (about 800 nm), but they have a drawback that the absorptivity readily changes due to crystal transformation. For example, the absorptivity at about 720 nm of a vapor deposition film of vanadyl phthalocyanine, changes to 815 nm by heating (Molecular Crystals and Liquid Crystrals 33, 149–170 (1976)).

Further, tetranaphthoporphyradine type compounds have absorptivity at the wavelength region of about 800 nm. However, those having no substituents on the naphthalene ring have extremely poor solubility to a solvent and thus have a drawback that it is thereby impossible to form a recording layer by a coating method.

Various proposals have been made also on tetranaphthoporphyradine derivatives having an alkyl or alkoxy group on the naphthalene ring (e.g. Japanese Unexamined Patent Publications No. 23451/1985 and 215663/1986). However, among such proposed tetranaphthoporphyradine derivatives, those having relatively good solubility to a solvent have a long chain alkyl group, and a solution thereof tends to be repelled when applied to a plastic substrate made of e.g. a methacrylic resin. Therefore, they have a drawback that it is difficult to obtain a uniform coating film. For instance, with a 2 wt % tetrachloroethane solution of VO-tetranaphthoporphyradine having a n-octyloxy group, it is difficult to obtain a uniform coating film on a polymethyl methacrylate plate by spin-coating.

It is an object of the present invention to provide an optical recording member of an organic substance which has high sensitivity to writing by the laser beam, particularly the semiconductor laser beam, has good stability in its preservation, and yet, is capable of forming a thin film by a coating method.

It is another object of the present invention to provide an optical recording member having a recording layer in which a tetranaphthoporphyradine derivative having a good film-forming property by a solvent solution coating method such as spin-coating is incorporated as a light absorbing substance.

The present invention has its gist in an optical recording member comprising a recording layer containing a light absorbing substance supported on a substrate in which recording is made by the thermal deformation of the recording layer owing to laser beams and reproducing is made by the reading the difference of the reflection between the non-deformation portion and the deformation portion, said light absorbing substance being represented

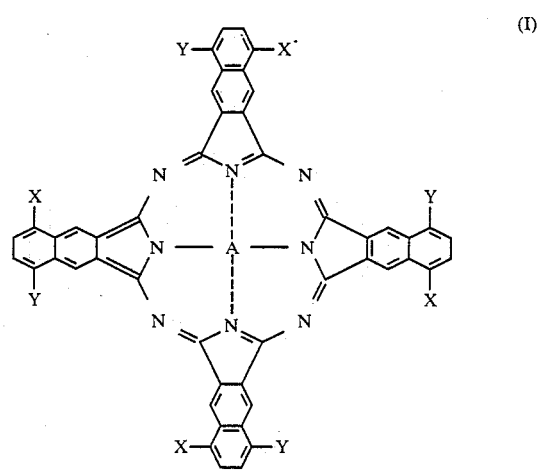

(I)

wherein one of X and Y is —O(C$_2$H$_4$O)$_n$R wherein R is an alkyl group which may be branched and n is a number of from 1 to 6, and the other is a hydrogen atom, and A is VO, Cu, Ni or Co.

Now, the present invention will be described in detail with reference to the preferred embodiments. The compound of the formula I of the present invention can be synthesized by heating a naphtahlene-2,3-dicarboxylic anhydride derivative of the formula:

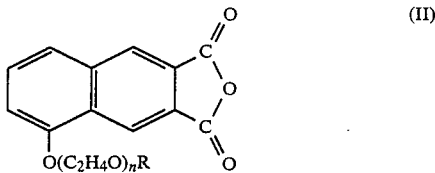

(II)

wherein R and n are as defined above, and a halide or oxide of vanadium, copper, nickel or cobalt in the presence of urea in a quinoline or chloronaphthalene solvent at a temperature of from 200° to 250° C. for from 1 to 5 hours. When a halide of nickel, cobalt or copper is employed as the metal compound in this reaction, it is preferred to add a small amount of ammonium molybdate as a catalyst, whereby the yield will increase.

The naphthoporphyradine compound of the present invention is represented by the formula I wherein R is an alkyl group, preferably an alkyl group having from 1 to 8 carbon atoms, more preferably a lower alkyl group having from 1 to 4 carbon atoms such as methyl, ethyl, propyl or butyl, and n is a number of from 1 to 6, preferably from 1 to 3, more preferably 3. The center atom represented by A is preferably VO.

Particularly preferred is a compound of the formula I wherein R is a n-butyl group, n is 3, and A is VO.

The optical recording member of the present invention is composed essentially of a substrate and a recording layer. However, it is possible to provide an undercoating layer on the substrate or a protecting layer on the recording layer, as the case requires.

In the present invention, the substrate may be transparent or opaque to the laser beams to be used.

As the material for the substrate according to the present invention, there may be exemplified paper, glass, plastics, metallic board or foil and so forth. Of these various substrate materials plastics is preferable from the standpoint of its stability and light weight. Examples of the plastics are: acrylic resin, methacrylic resin, polycarbonate resin, vinyl chloride resin, vinyl acetate resin, polyester resin, polyethylene resin, polypropylene resin, polyimide resin, polysulfone resin, epoxy resin, and so forth.

As the film forming method for the recording layer, there may be enumerated various known methods such as vacuum deposition of the thin film on the substrate; mixing of the thin film material with a resin solution and applying the mixed solution on the substrate; dissolution of the thin film material in a solvent and coating the solution on the substrate; or immersing the substrate into the coating liquid; and others. In particular, the compound of the present invention is suitable for the coating method, since it has good solubility to the solvent.

The film forming by the application of the coating liquid may be attained by dissolving the compound as represented by the foregoing general formula I as the light absorbing substance into a solvent, for instance, with addition of a binder, as the case may be, and spin-coating the coating liquid onto the substrate. As the binder, there may be exemplified polyimide resin, polyamide resin, polystyrene resin, acrylic resin, polyester resin, polycarbonate resin, cellulosic resin, and so forth.

A ratio of such light absorbing substance to the resin should desirably be 10% by weight or above.

As the solvent, there may be used dimethyl formamide, methyl ethyl ketone, methylcellosolve, ethanol, tetrahydrofuran, dichloromethane, chlorobenzene, tetrachloroethane and various others.

The recording layer containing the light absorbing substance for the optical recording member according to the present invention usually has a thickness of from 100 Å to 5 μm, preferably from 500 Å to 3 μm.

The recording layer for the optical recording member according to the present invention may be provided on both surfaces of the substrate or on one surface thereof.

Recording of information onto the recording member which has been obtained in the above-described manner is effected by irradiating a laser beam, preferably a semiconductor laser beam collimated to a beam diameter of 1 μm or so onto the recording layer provided on both surfaces or one surface of the substrate. Those portions of the recording layer irradiated by the laser beam bring about thermal deformation such as decomposition, evaporation, fusion, etc. owing to its absorption of the laser energy.

Reproduction of the recorded information is done by reading of a difference in the reflection factor between the portion where the thermal deformation has occurred by the laser beam and the portion where such thermal deformation has not taken place.

As the light source, various lasers such as He-Ne laser, Ar laser, semiconductor laser, etc. may be used. Among them, the semiconductor laser is particularly preferable in respect of the price and the size of the laser device.

The semiconductor laser to be used may have its central wavelength of 830 nm, 780 nm, and a wavelength shorter than these.

Now, the present invention will be described in further detail with reference to Examples. However, it should be understood that the present invention is by no means restricted by these specific Examples. In these Examples, "%" means "% by weight" unless otherwise specifically indicated.

EXAMPLE 1

(a) Preparation of light absorbing substance

Firstly, 100 g of 5-hydroxy-2,3-naphthalene dicarboxilic acid (melting point: 294°–296° C.) was dispersed in 1 liter of methanol, and then 5 ml of 97% sulfuric acid was added thereto. The mixture was stirred under reflux for 20 hours. After being left to cool, the reaction mixture was poured into 4 liters of ice water. Precipitated crystals were collected by filtration, washed with water and dried to obtain 102 g of dimethyl 5-hydroxy-2,3-naphthalene dicarboxylate having a melting point of from 121° to 123° C. The chemical structure was confirmed by its mass spectrum.

Then, 26 g of this dimethyl 5-hydroxy-2,3-naphthalene dicarboxylate, 47 g of p-toluenesulfonic acid [(n-butoxy)ethoxy]ethoxyethyl ether preliminarily prepared by a usual method from p-toluenesulfonyl chloride and triethyleneglycol-mono-n-butyl ether and 9.0 g of potassium carbonate were dispersed in 500 ml of chlorobenzene, and the dispersion was stirred under reflux for 10 hours. After cooling, precipitated crystals were filtered off, and the filtrate was subjected to distillation under reduced pressure to remove chlorobenzene, whereby 45 g of slightly brown tar-like substance was obtained. This tar-like substance was dispersed in 500 ml of a 5% NaOH aqueous solution, and the dispersion was stirred under reflux for 5 hours. After cooling, concentrated hydrochloric acid was dropwise added thereto under cooling with ice to bring the reaction mixture to pH3. Then, the precipitated product was collected by filtration and dried to obtain 29 g of white crystals. The crystals were recrystallized from acetone to obtain 5-{[(n-butoxy)ethoxy]ethoxy}-ethoxy-2,3-naphthalenedcarboxylic anhydride having a melting point of from 76° to 80° C. and having the following structure (this structure was confirmed by its mass spectrum).

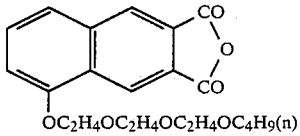

Then, 3.90 g (0.01 mol) of this anhydride and 10 g of urea were pulverized and mixed in a mortar, and then reacted at a temperature of from 150° to 180° C. for 3 hours. After cooling the reaction mixture to about 100° C., 1.0 g of vanadium trichloride and 10 ml of quinoline were added thereto, and the mixture was heated and stirred at a temperature of from 200° to 240° C. for 2 hours. The mixture was left to cool to room temperature, and 100 ml of methanol was added thereto. The mixture was stirred under reflux for 3 hours. The product was subjected to filtration, and crystals thereby obtained were dispersed in 200 ml of a 1% NaOH aqueous solution The dispersion was stirred under reflux for 2 hours. The crystals were collected by filtration and again subjected to a similar treatment with a 1% NaOH aqueous solution. Then, crystals thereby obtained were washed with water, dried and subjected to heat extraction with 200 ml of chloroform. Then, chloroform was distilled off under reduced pressure to obtain 1.7 g of dark green crystals. Then, 200 ml of acetone was added to the crystals, and the mixture was stirred under reflux for 2 hours and then subjected to hot filtration to obtain 1.0 g of blackish green crystals.

The crystals contained a certain amount of isomers, but the majority was the compound represented by the following structure. As shown hereinafter in Table 1, $\lambda_{max}$ of the crystals in chloroform was 820 nm and the absorptivity coefficient $\epsilon$ was $1.85 \times 10^5$.

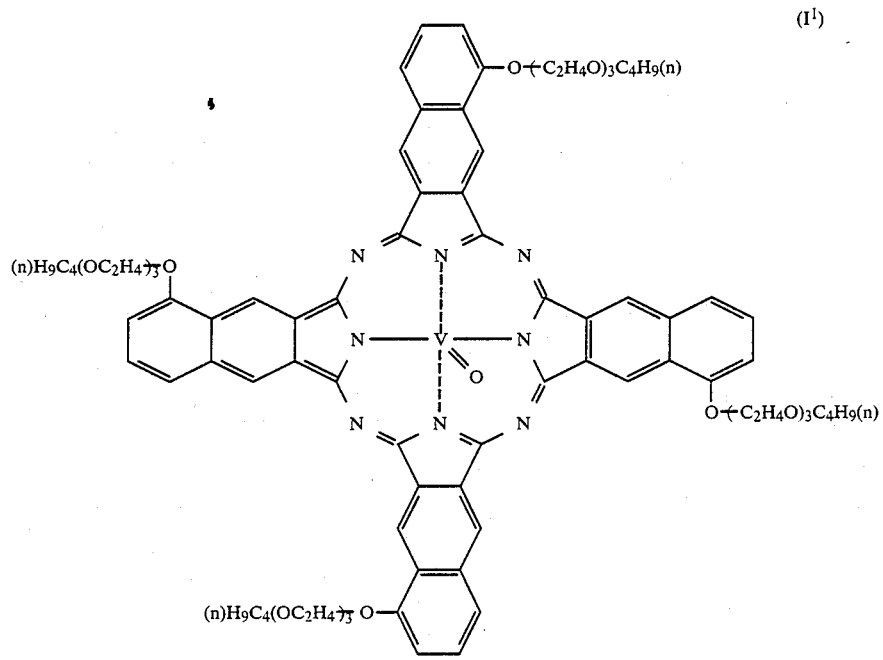

(b) Optical Recording Member

A 2% tetrachloroethane solution of the compound of the formula $I^1$ as a light absorbing substance obtained in step (a) was prepared. This solution was coated on a methacrylic resin substrate having a thickness of 1.2 mm by spin-coating (rotational speed: 1000 rpm). The coated resin film (recording layer) had a maximum absorbing wavelength of 840 nm, and the absorption peak was broad. To this thin film, a laser beam having its central wavelength of 830 nm was irradiated with a beam diameter of 1 μm at an output of 4 mW, whereupon pits of very clear and distinct profiles, each having a width of about 1 μm and a pit length of about 2 || m, were formed. The carrier level/noise level ratio (C/N ratio) was 51 dB. The storage stability in terms of the writing performance (C/N ratio) by the semiconductor laser after the storage in a constant temperature and humidity vessel at a temperature of 60° C. under a relative humidity of 80% for ten days, was 51 dB.

EXAMPLES 2 TO 4

(a) Preparation of Light Absorbing Substances

In the same manner as in step (a) of Example 1, light absorbing substances i.e. the compounds represented by the following formulas $I^2$, $I^3$ and $I^4$ were prepared, respectively. The maximum absorbing wavelength $\lambda_{max}$ of each light absorbing substance in a chloroform solvent and the absorptivity coefficient $\epsilon$ were as shown in Table 1.

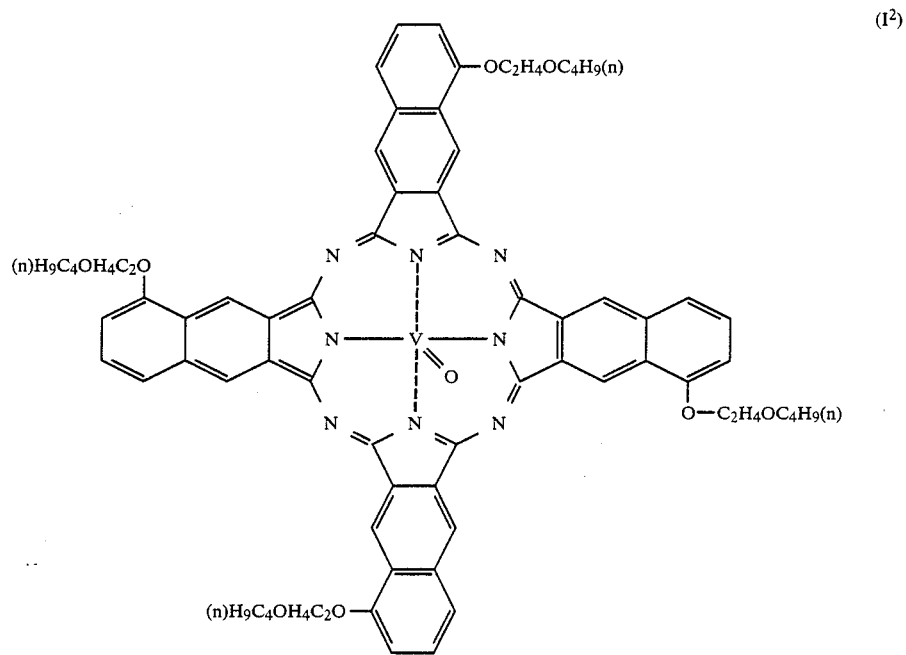
(I²)
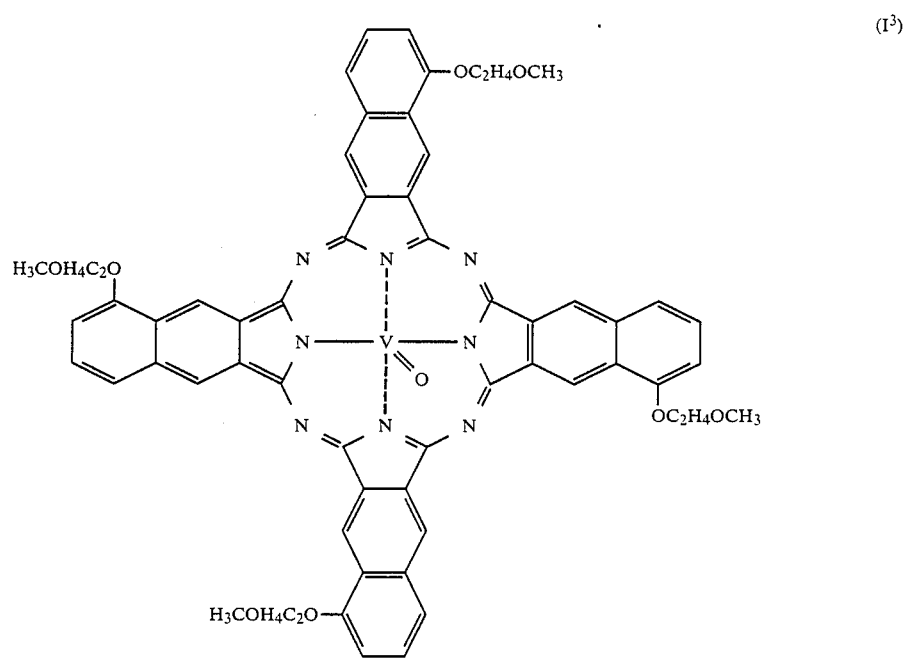
(I³)

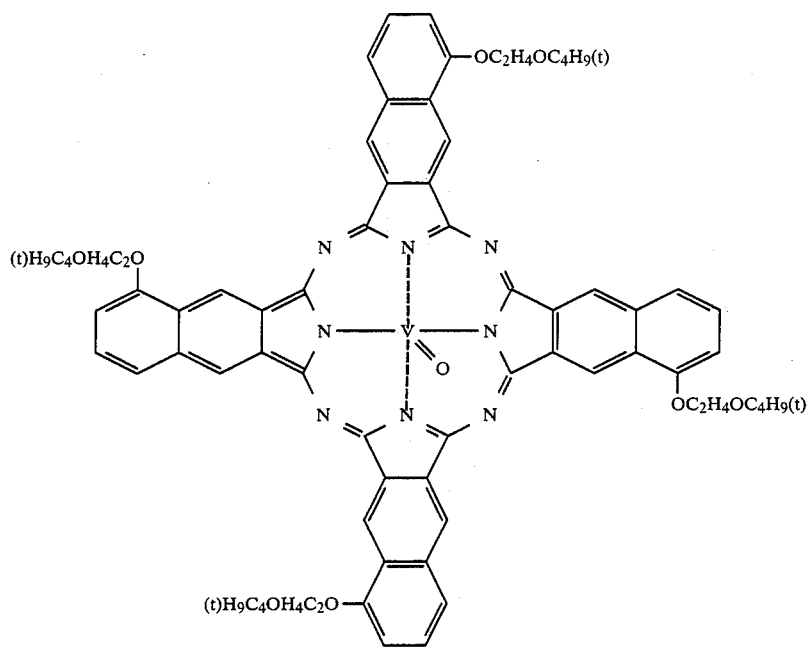

TABLE 1

| Light absorbing substance | Formula of the main component | $\lambda_{max}$ (nm) | Absorptivity coefficient $\epsilon$ |
|---|---|---|---|
| Example 1 | $I^1$ | 820 | $1.85 \times 10^5$ |
| Example 2 | $I^2$ | 825 | $2.25 \times 10^5$ |
| Example 3 | $I^3$ | 828 | $2.10 \times 10^5$ |
| Example 4 | $I^4$ | 829 | $1.95 \times 10^5$ |

(b) Optical Recording Members

Each light absorbing substance obtained in step (a), the main component of which is represented by the above-mentioned formula $I^2$, $I^3$ or $I^4$, was coated on a methacrylic resin substrate in the same manner as in step (b) of Example 1.

With respect to each thin coating film thereby obtained, the maximum absorbing wavelength, the C/N ratio during semiconductor laser recording and the storage stability are shown in Table 2 together with the results of step (b) of Example 1.

TABLE 2

| | | Physical values of the recording layer | | |
|---|---|---|---|---|
| Examples | Formula of the main component of light absorbing substance | Maximum absorbing wavelength (nm) | C/N ratio (dB) | Storage stability C/N ratio (dB) |
| 1 | $I^1$ | 839 | 51 | 51 |
| 2 | $I^2$ | 840 | 52 | 51 |
| 3 | $I^3$ | 845 | 50 | 50 |
| 4 | $I^4$ | 847 | 48 | 48 |

EXAMPLE 5

(a) Preparation of Light Absorbing Substance 3.90 g (0.01 mol) of 5-{[(n-butoxy)ethoxy]ethoxy}-ethoxy-2,3-naphthalenedicarboxylic anhydride prepared in step (a) of Example 1, 10 g of urea and 0.1 g of ammonium molybdate were pulverized and mixed in a mortar, and then reacted under heating at a temperature of from 150 to 180° C. for 3 hours. After the reaction, the mixture was cooled to about 100° C., and then 1 g of cobalt chloride hexahydrate and 10 ml of quinoline were added thereto, and the mixture was heated and reacted at a temperature of from 200° to 240° C. for 3 hours under stirring. The reaction product was cooled to room temperature, and then 100 ml of methanol was added thereto. The mixture was heated and stirred under reflux for 3 hours. The product was subjected to hot filtration, and the filtrate thereby obtained was added to 300 ml of 1% of hydrochloric acid. Precipitated crystals were collected by filtration and dried to obtain crystals having a low melting point.

Then, 100 ml of toluene was added to the crystals, and the crystals were dissolved under heating. After cooling, 30 ml of n-hexane was added to the solution, and the mixture was cooled with ice. Precipitated crystals were filtered off and the filtrate was subjected to distillation under reduced pressure to remove toluene and n-hexane to obtain a tar-like substance. Then, the tar-like substance was crystallized by an addition of n hexane and subjected to filtration to obtain 2.2 g of green crystals. The crystals were added to 100 ml of a 1% NaOH aqueous solution, and the mixture was stirred under reflux for one hour. Then, the reaction mixture was left to cool and subjected to filtration. This substance was composed mainly of a compound having the following formula and $\lambda_{max}$ of this substance in a chloroform solvent was 769 nm.

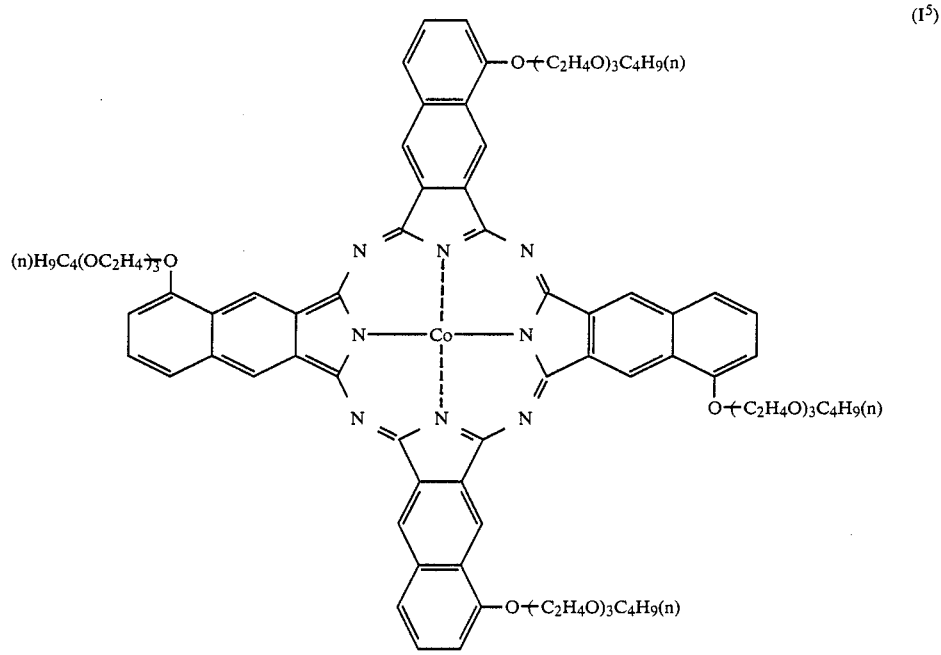

(I⁵)

(b) Optical Recording Member

The light absorbing substance obtained in step (a), the main component of which is the compound of the formula I⁵, was coated on a methacrylic resin plate in the same manner as in step (b) of Example 1.

The maximum absorbing wavelength of the coated thin film (recording layer) thus obtained, was 770 nm, and the absorption peak was broad.

To this thin film, a laser beam having its central wavelength of 780 nm was irradiated with a beam diameter of about 1 μm at an output of 4 mW, whereupon pits of very clear and distinct profiles, each having a width of about 1 μm and a pit length of about 2 μm, were formed. The carrier level/noise level ratio (C/N ratio) thereof was 48 dB. Further, the storage stability in terms of writing performance (C/N ratio) by the semiconductor laser after the storage in a constant temperature and humidity vessel at a temperature of 60° C. under a relative humidity of 80% for ten days, was 47 dB.

EXAMPLE 6

In the same manner as in step (a) of Example 5, 5-{[(n-butoxy)ethoxy]ethoxy}ethoxy-2,3-naphthalenedicarboxylic anhydride and anhydrous nickel chloride were reacted to obtain a light absorbing substance composed mainly of a compound represented by the following formula. The maximum absorbing wavelength $\lambda_{max}$ of this substance in a chloroform solvent was 775 nm.

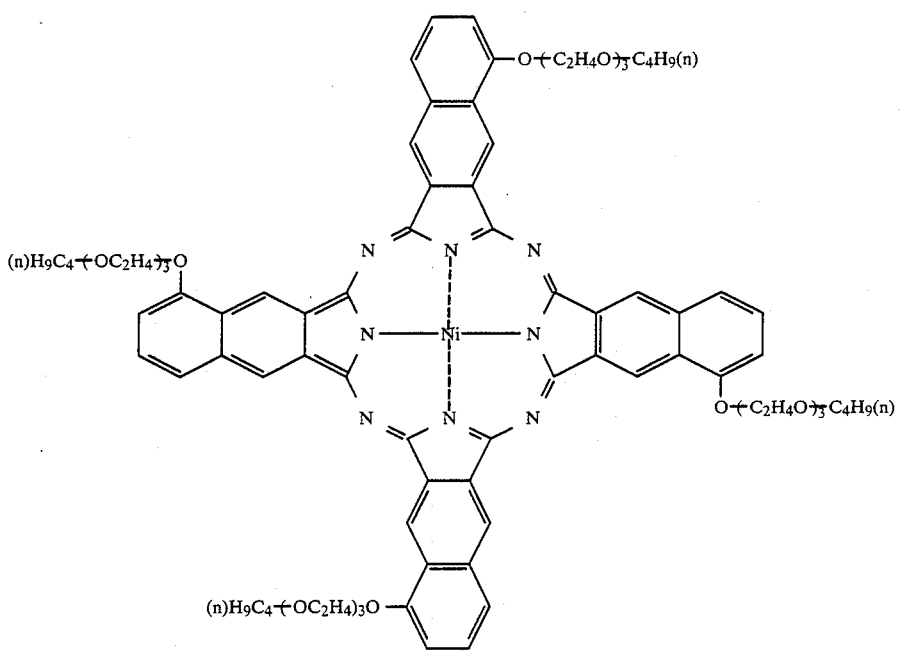

(b) Optical Recording Member

The light absorbing substance obtained in step (a), the main component of which is the compound of the formula $I^6$, was coated on a methacrylic resin substrate in the same manner as in step (b) of Example 1.

The maximum absorbing wavelength, the C/N ratio during semiconductor laser recording with a central wavelength of 780 nm and the storage stability of the thin film (recording layer) thus obtained, were as shown in Table 3. In Table 3, similar physical values of Example 5 were also presented.

TABLE 3

| Examples | Formula of the main component of light absorbing substance | Physical values of the recording layer | | |
|---|---|---|---|---|
| | | Maximum absorbing wavelength (nm) | C/N ratio (dB) | Storage stability C/N ratio (dB) |
| 5 | $I^5$ | 770 | 48 | 47 |
| 6 | $I^6$ | 760 | 47 | 45 |

COMPARATIVE EXAMPLE 1

In the same manner as in step (a) of Example 1, a substance composed essentially of a tetranaphthoporphyradine derivative presented by the following formula was prepared. The maximum absorbing wavelength $\lambda_{max}$ of this substance in a chloroform solvent was 810 nm.

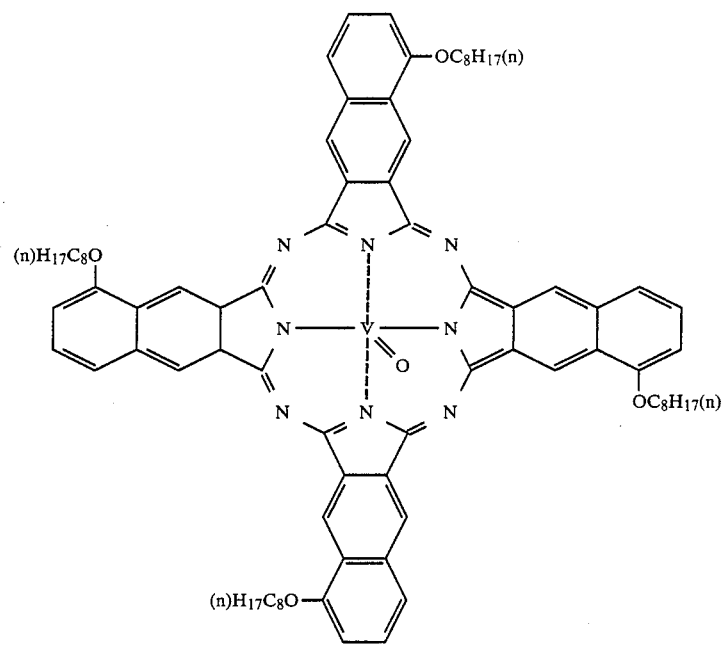

A 2% tetrachloroethane solution of this substance was

If was attempted to coat this solution on a methacrylic resin substrate having a thickness of 1.2 mm by spin-coating (rotational speed: 500–200 rpm), but it was impossible to obtain a uniform coating film since the solution was repelled on the resin substrate.

In the optical recording member of the present invention, the light absorbing substance incorporated in its recording layer is a tetranaphthoporphyradine derivative having a specific chemical structure which has excellent solubility in an organic solvent and a solvent solution of which has excellent compatibility with a resin substrate, whereby the recording layer can readily be formed on a resin substrate by coating a solvent solution of the derivative. The recording layer is suitable for high density information recording and reproduction, and the storage stability of the recording is thereby excellent.

We claim:

1. An optical recording member comprising a recording layer containing a light absorbing substance supported on a substrate in which recording is made by the thermal deformation of the recording layer owing to laser beams and reproduction is made by the reading the difference of the reflection between the non-deformation portion and the deformation portion, said light absorbing substance being represented by the following formula:

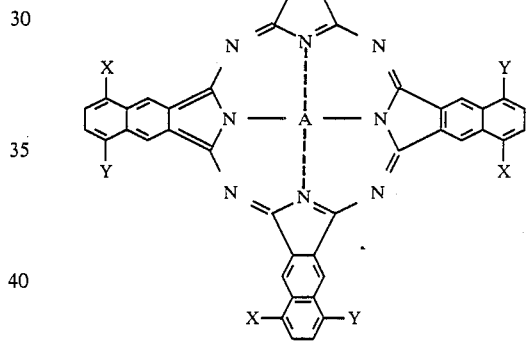

wherein one of X and Y is —O(C$_2$H$_4$O)$_n$R wherein R is an alkyl group which may be branched and n is a number of from 1 to 6, and the other is a hydrogen atom, and A is VO, Cu, Ni or Co.

2. The optical recording member according to claim 1, wherein A in the formula I is VO.

3. The optical recording member according to claim 1, wherein R in the formula I is an alkyl group having from 1 to 8 carbon atoms, and n is a number of from 1 to 3.

4. The optical recording member according to claim 1, wherein R in the formula I is an alkyl group having from 1 to 4 carbon atoms, and n is a number of from 1 to 3.

5. The optical recording member according to claim 1, wherein A in the formula I is VO, R is —CH$_2$CH$_2$CH$_2$CH$_3$ and n is 3.

6. The optical recording member according to claim 1, wherein the recording layer has a thickness of from 100 Å to 5 μm.

7. The optical recording member according to claim 6, wherein the recording layer has a thickness of from 500 Å to 3 μm.

8. The optical recording member according to claim 1, wherein the substrate is made of a methacrylic resin.

* * * * *

UNITED STATES PATENT AND TRADEMARK OFFICE
CERTIFICATE OF CORRECTION

PATENT NO. : 4,904,567

DATED : Feb. 27, 1990

INVENTOR(S) : Shuichi Maeda, et al

It is certified that error appears in the above-identified patent and that said Letters Patent is hereby corrected as shown below:

The Foreign Application Priority Data is incorrect, should read:

```
-- Aug. 13, 1985   [JP]   Japan..........178221/1985
    Feb. 19, 1987  [JP]   Japan..........034448/1987--
```

Signed and Sealed this

Fourteenth Day of May, 1991

Attest:

HARRY F. MANBECK, JR.

Attesting Officer

Commissioner of Patents and Trademarks